US012401127B2

(12) United States Patent
Li

(10) Patent No.: US 12,401,127 B2
(45) Date of Patent: Aug. 26, 2025

(54) SYSTEMS AND METHODS FOR PROVIDING AN IMPEDANCE TRANSFORMER FOR A HELIX ANTENNA

(71) Applicant: L3Harris Global Communications, Inc., Melbourne, FL (US)

(72) Inventor: Qian Li, Pittsford, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 285 days.

(21) Appl. No.: 18/332,645

(22) Filed: Jun. 9, 2023

(65) Prior Publication Data

US 2024/0413539 A1 Dec. 12, 2024

(51) Int. Cl.
*H01Q 11/08* (2006.01)
*H01Q 5/50* (2015.01)

(52) U.S. Cl.
CPC ............... *H01Q 11/08* (2013.01); *H01Q 5/50* (2015.01)

(58) Field of Classification Search
CPC ........... H01Q 1/362; H01Q 5/50; H01Q 11/08
See application file for complete search history.

(56) References Cited

U.S. PATENT DOCUMENTS 5,081,469 A 1/1992 Bones
6,150,994 A 11/2000 Winter et al.
6,281,859 B1 8/2001 Winter et al.
7,002,530 B1 2/2006 Chung et al.
7,245,268 B2 7/2007 O'Neill, Jr. et al.
2011/0215984 A1 9/2011 Coburn et al.

FOREIGN PATENT DOCUMENTS

GB 1507836 4/1978

OTHER PUBLICATIONS

Kraus, "A 50-ohm input impedance for helical beam antennas," IEEE Transactions on Antennas and Propagation, vol. 25, No. 6, p. 913 (Nov. 1977).
Kgwadi, "Parametric study of broadband tunable helix antenna matching," 2014 Loughborough Antennas and Propagation Conference, 10-11, pp. 128-131 (Nov. 2014).

*Primary Examiner* — Robert Karacsony
(74) *Attorney, Agent, or Firm* — Fox Rothschild LLP; Carol E. Thorstad-Forsyth

(57) ABSTRACT

Systems and methods for improving operations of an antenna element. The methods comprise: coupling an impedance transformer to a ground plane structure of the antenna element (wherein the impedance transformer comprises at least one conductive structure protruding out and away from the ground plane structure in a direction towards a helical structure of the antenna element); adjusting a size of a gap provided between the at least one conductive structure of the impedance transformer and the helical structure until an impedance of the helical antenna matches an impedance of a transmission line at one or more frequencies; and securing the impedance transformer to the ground plane structure so that the size of the gap is maintained while the antenna element is being used to facilitate communications.

18 Claims, 9 Drawing Sheets

SYSTEMS AND METHODS FOR PROVIDING AN IMPEDANCE TRANSFORMER FOR A HELIX ANTENNA

BACKGROUND

Description of the Related Art

Space based communication systems often employ helical antenna structures. The helical antenna comprises one or more conducting wires wound in the form of a helix. Directional helical antennas are mounted over a ground plane structure. The feed line is connected between the bottom of the helical antenna and the ground plane structure. Helical antennas operate in two modes: a normal mode and an axial mode. In normal mode, the diameter and the pitch of the windings are relatively small compared with the wavelength and a standing wave current flows. In axial mode, the circumference of each turn of the windings are comparable with the wavelength and a traveling wave current flows. Axial mode antennas provide a directive beam.

SUMMARY

The present disclosure concerns implementing systems and methods for improving operations of an antenna element. The methods comprise: coupling an impedance transformer to a ground plane structure of the antenna element (wherein the impedance transformer comprises at least one conductive structure protruding out and away from the ground plane structure in a direction towards a helical structure of the antenna element); adjusting a size of a gap provided between the at least one conductive structure of the impedance transformer and the helical structure until an impedance of the helical antenna matches an impedance of a transmission line at one or more frequencies; securing the impedance transformer to the ground plane structure so that the size of the gap is maintained while the antenna element is being used to facilitate communications; and/or re-adjusting the size of the gap responsive to a change in an impedance of the helical antenna (wherein the re-adjusting is achieved by repositioning the impedance transformer relative to the ground plane structure).

The size of the gap may be constant along a width of the impedance transformer or vary along a width of the impedance transformer. A height of the conductive structure may be equal to or greater than a height of a segment of a helical winding relative to the ground plane structure. The segment of the helical winding may comprise a first quarter of a first turn thereof.

The impedance transformer may comprise a plurality of conductive structures that are coupled to the ground plane structure so as to (i) be spaced apart from each other and (ii) protrude out and away from the ground plane structure in the direction towards the helical structure. The size of the gap between each of the plurality of conductive structures and the helical antenna may be adjusted. The size of the gap associated with a first one of the plurality of conductive structures may be the same as or different than the size of the gap associated with a second one of the plurality of conductive structures.

The present disclosure concerns an antenna element. The antenna element comprises: a helical antenna comprising a helical winding that extends along an axis of the antenna element and has a plurality of turns; a ground plane structure coupled to the helical antenna; an impedance transformer that is (i) integrally formed with or coupled to the ground plane structure so as to be spaced apart from the helical winding and (ii) configured to transform an impedance of the helical winding to an impedance of a transmission line; and a gap, provided between the impedance transformer and the helical winding, with a size selected to enable matching of the impedance of the helical winding to the impedance of the transmission line by a certain amount at particular frequencies. The size of the gap may be constant along a width of the impedance transformer or vary along a width of the impedance transformer.

A position of the impedance transformer relative to the ground plane structure and the helical winding may be adjustable. The impedance transformer may comprise a conductive structure protruding out and away from the ground plane structure in a direction towards the helical structure. A height of the conductive structure may be equal to or greater than a height of a first quarter of a first turn of the helical winding relative to the ground plane structure. The size of the gap may be increased or decreased by repositioning the impedance transformer relative to the ground plane structure, responsive to a change in the impedance of the helical winding.

The impedance transformer may comprise a plurality of conductive structures that are coupled to the ground plane structure so as to (i) be spaced apart from each other and (ii) protrude out and away from the ground plane structure in the direction towards the helical antenna. The size of the gap between each of the plurality of conductive structures and the helical antenna may be adjustable. The size of the gap associated with a first one of the plurality of conductive structures may be the same as or different than the size of the gap associated with a second one of the plurality of conductive structures.

BRIEF DESCRIPTION OF THE DRAWINGS

The present solution will be described with reference to the following drawing figures, in which like numerals represent like items throughout the figures.

DETAILED DESCRIPTION

Figure 1:
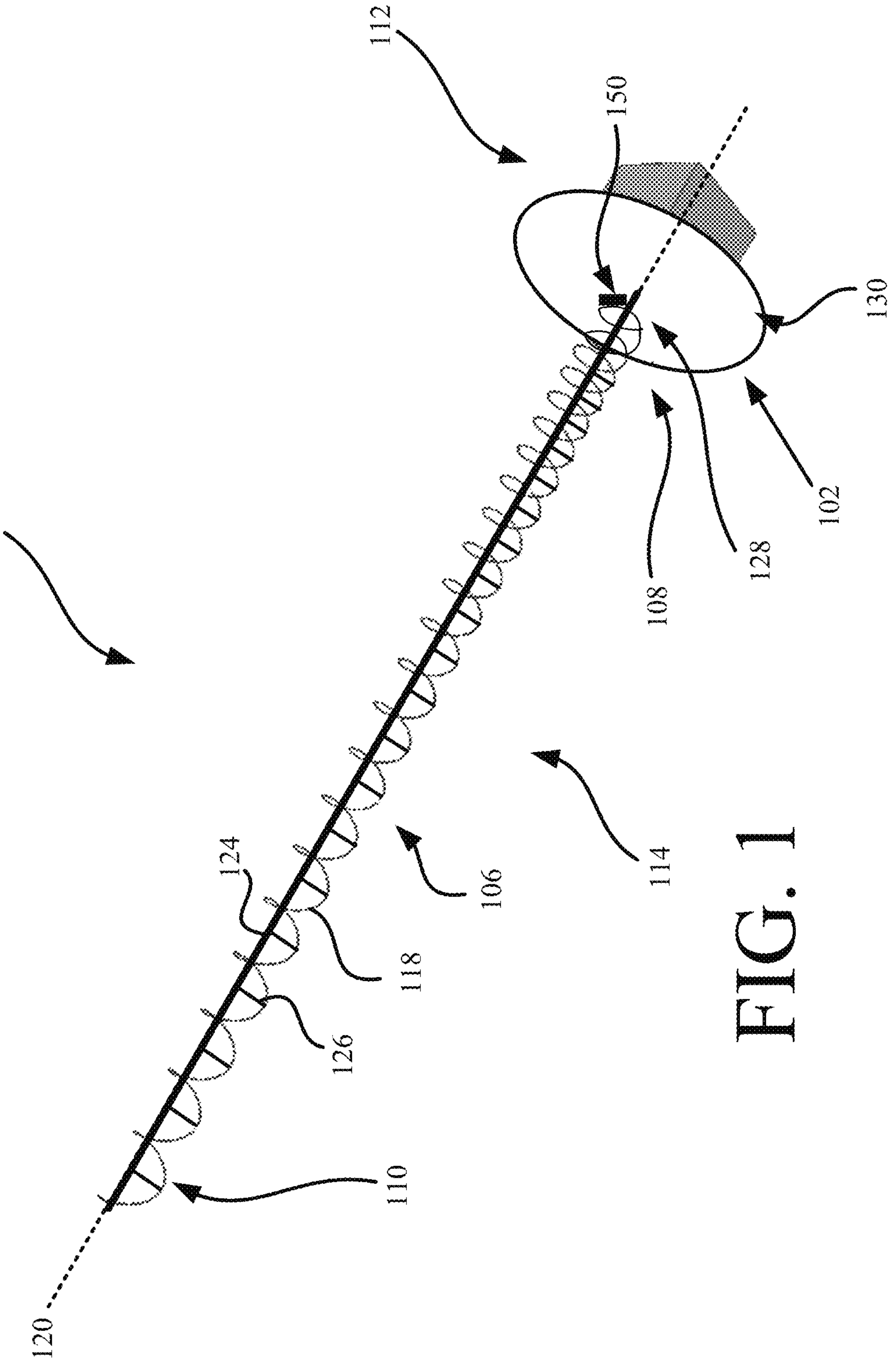
FIG. 1 provides a perspective view of an illustrative communication system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In this document, when terms such "first" and "second" are used to modify a noun, such use is simply intended to distinguish one item from another, and is not intended to require a sequential order unless specifically stated.

A satellite communication (SATCOM) mobile user objective system (MUOS) band may be 240-380 MHz. The typical impedance of a conductive helical antenna made of uniform metal wire or tubing is between 120-150 Ohm for this SATCOM MUOS band. RF transmission lines in conventional wireless applications have a 50 Ohm characteristic impedance. Therefore, the helix antenna impedance (120-150 Ohm) needs to be transformed to the typical transmission line impedance (50 Ohm) to prevent one decibel (1 dB) loss due to impedance mismatch.

Conventional solutions exist for the impedance mismatch issue. One such solution involves modifying the conductive helical tubing which is difficult to work with due to relatively large tubing diameter and rigid metal materials. Another such solution is to build a matching network on a circuit board and add the same to the helical antenna. This additional matching network circuit board increases the complexity and cost of the helical antenna.

A novel robust, simple and effective impedance transformer is described herein to solve this impedance mismatch issue. Instead of modifying the conductive helical element (for example, helical tube or wire) or inserting an additional matching circuit board to the helical antenna, the present solution creates an impedance transformer by modifying the ground plane of the helical antenna. The modification can be achieved by adding metal structure(s) to the ground plane such that the metal structure(s) protrude out and away from the ground plane in a direction towards the conductive helical element. Impedance tuning of the helical antenna can be achieved simply by adjusting the position of the metal structure(s) on the ground plane relative to the conductive helical element. When the helical antenna impedance changes for any reason, the metal structure(s) can be re-positioned to re-match the changed impedance to 50 Ohm. For example, a metal structure can be moved closer to or farther from the conductive helical element.

The impedance transformer can be used with helical antennas in space based communication applications and ground based communication applications. The present solution can be used with other antennas not just helical antennas.

Referring now to FIG. 1, there is provided an illustration of a communication system 100 with an antenna element 114 coupled to communications equipment 112. The antenna element 114 is operable at relatively low frequencies (for example, 240 MHz-380 MHz) such as those in the SATCOM MUOS band. The communications equipment 112 is configured to facilitate satellite communications. Communications equipment for satellite communication is well known in the art. The communications equipment can include, but is not limited to, solar panels, a radio frequency (RF) amplifier and/or a transceiver. The communications equipment 112 is electrically connected to the antenna element 114 so that (A) an RF signal may be provided from the communications equipment 112 to the antenna element 114 when the communication system 100 is being used as an RF wave device or (B) an RF wave may be provided from the antenna element 114 to the communications equipment 112 when the communication system 100 is being used as a wave device.

The antenna element 114 comprises a ground plane structure 102 cooperating with a helical structure 106 coupled thereto. An impedance transformer 150 is coupled to the ground plane structure 102. The particulars of the impedance transformer 150 will be discussed in detail below.

Figure 2:
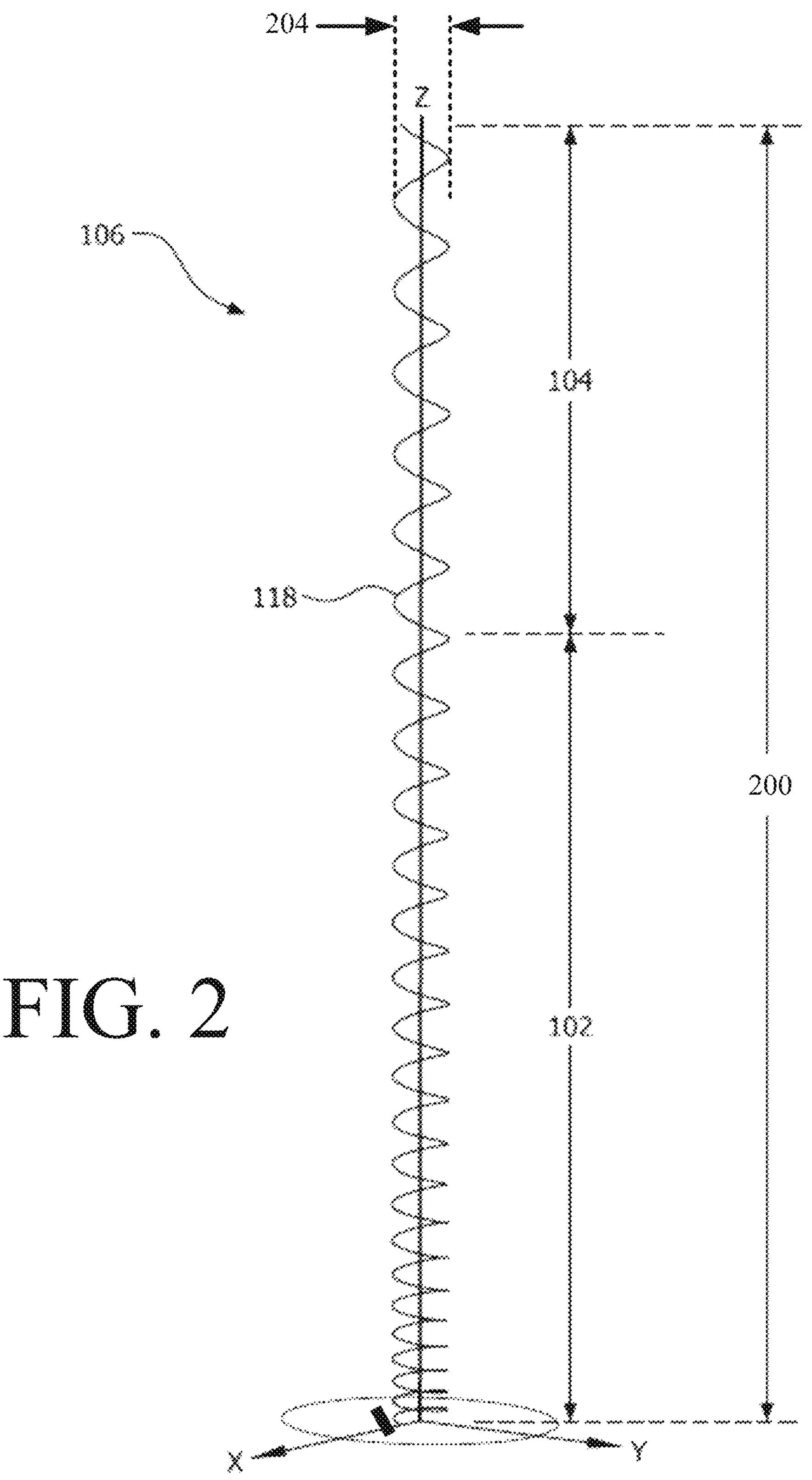
FIG. 2 provides a side view of the antenna element shown in FIG. 1.

As shown in FIGS. 1-2, the ground plane structure 102 is coupled to a proximal end 108 of the helical structure 106. Charge is separated between the ground plane structure 102 and the helical structure 106 at a small discontinuity or feed gap 128 located between the ground plane structure 102 and the helical structure 106. There RF power is applied to and received from the antenna by a coaxial cable (not shown). The impedance transformer 150 is provided to convert the antenna impedance (for example, 120-150 Ohms) to the coaxial cable impedance (for example, 50 Ohms or other values).

The ground plane structure 102 comprises a solid plate 130. The solid disc 130 is formed of an electrically conductive material, such as metal (for example, aluminum, graphite, or copper). The solid plate 130 has a circular cross-sectional profile. The solid plate 130 can have other non-circular cross-sectional profiles (for example, a square cross-section profile). The cross-sectional profile of the solid plate can be selected in accordance with a given application. Apertures (not shown) may optionally be formed through the solid plate in accordance with any given application. The apertures may be generally circular or non-circular in shape.

Figure 3:
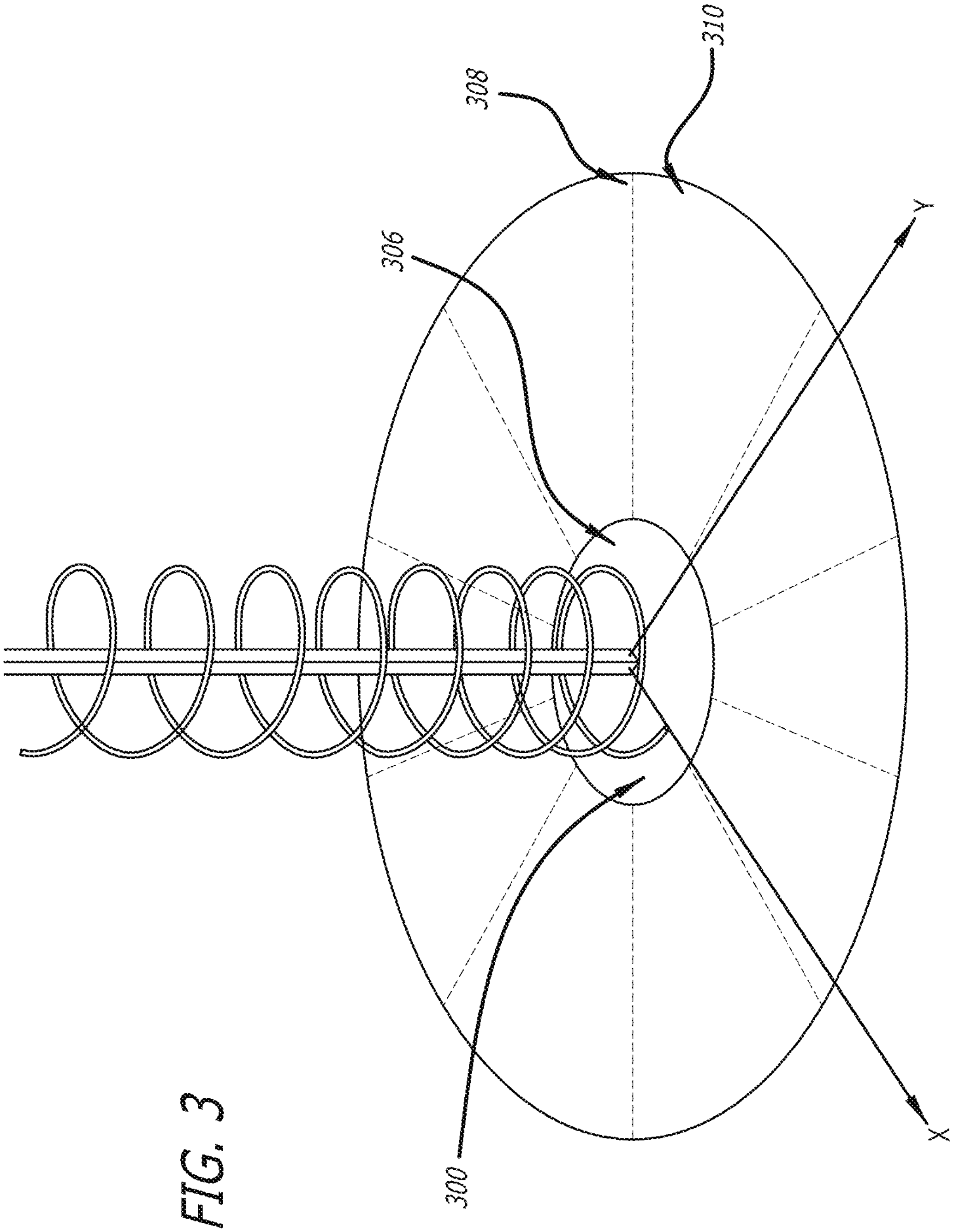
FIG. 3 provides a perspective view of a helical antenna coupled to a ground plane.

The present solution is not limited to this particular configuration of the ground plane structure shown in FIG. 1. Another configuration that can be employed herein is shown in FIG. 3. This ground plane configuration comprises, a solid plate 300, ribs 308 coupled to the solid plate and a webbed structure 310 supported by the ribs. The solid plate and webbed structure may have a circular cross-sectional profile.

As shown in FIGS. 1-2, the helical structure 106 comprises a conductive helix element 118 helically wound along an axis 120, which coincides with the boresight of the antenna element 114. The conductive helix element 118 is coupled to and structurally supported by a bar 124 via arms, struts or posts 126. Bar 124 is aligned with and extends along axis 120 as shown in FIG. 1. Bar 124 is formed of a rigid material, such as a metal or plastic. Arms, struts or posts 126 are formed of a rigid or semi-rigid material (for example, metal or plastic). The arms or posts 126 can be provided at regular or irregular intervals along the length of the bar 124, i.e., adjacent arms or posts have the same or different spacing therebetween.

In some scenarios, bar 124 comprises an axially expansive bar that transitions from a retracted position (not shown) to an extended position shown in FIG. 1. Axially expansive bars are well known in the art, and therefore will not be described herein. For example, the axially expansive bar includes a telescoping bar. The axially expansive feature of the bar facilitates stowing of the communication system 100 in a relatively small area of a storage compartment (for example, that of a spacecraft or aerial vehicle). The present solution is not limited to the particulars of this scenario.

Figure 4:
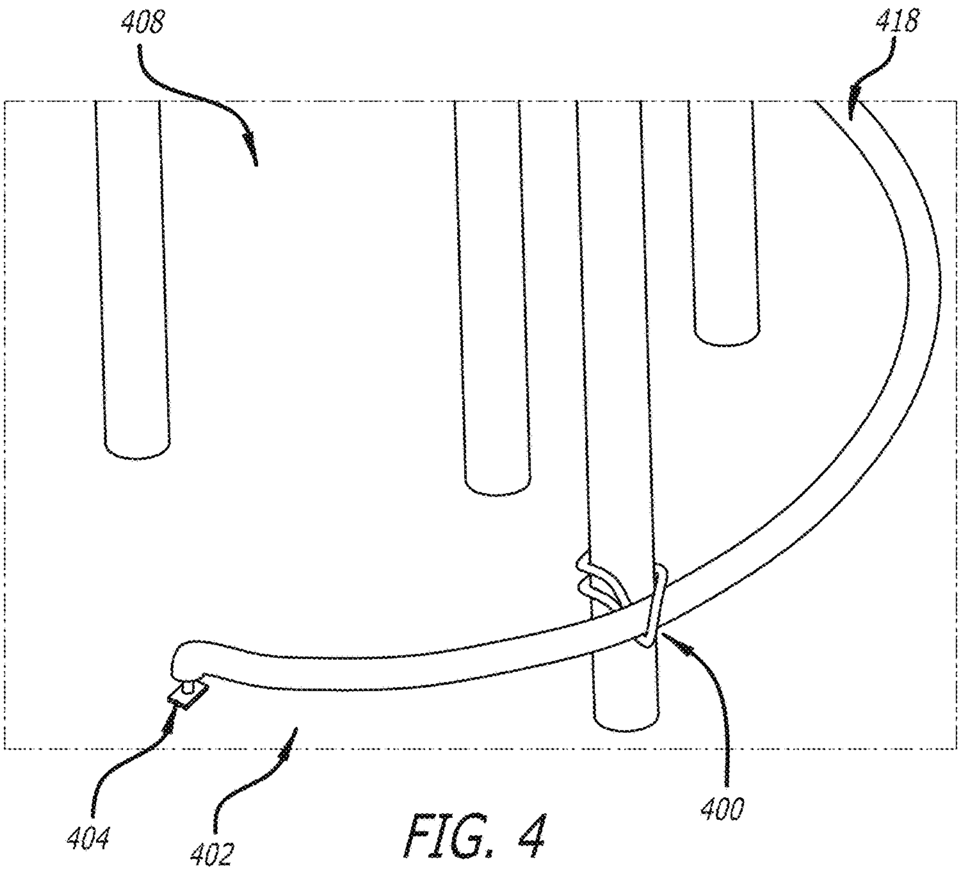
FIG. 4 provides an illustration of a helical antenna element without impedance transformer.

In those or other scenarios, sewn longitudinal tapes (or an outer fabric sleeve) are (is) provided to further structurally support the conductive helix element 118 and constrain the expansion of the conductive helix element 118 caused by vibration. The longitudinal tapes and/or outer fabric sleeve (are) is not shown in FIGS. 1-2 for ease of illustration, but are shown in FIG. 4 in relation to reference number 400. The present solution is not limited in this regard.

The conductive helix element 118 extends along the axis 120, has a helix circumference (for example, 0.25λ), an outer diameter 204 (for example, 3 feet), and a length 200 (for example, 5 feet). The conductive helix element 118 is shown as comprising a circular cross-section helix. The present solution is not limited in this regard. The conductive helix element 118 can alternatively comprise a square cross-section helix, a rectangular cross-section helix, a triangular cross-section helix, or any other shaped helix. The conductive helix element 118 is formed of any conductive wire or tube(s). The conductive wire or tube(s) may be insulated or uninsulated, and formed of any conductive material (for example, a nickel-titanium alloy, copper or aluminum).

During transmit operations, current and radio waves travel along the conductive helix element 118 from its proximal end 108 to its distal end 110. The conductive helix element 118 has a winding pitch angle at any location along its length that is tailored to optimize the exchange of energy between a free space wave and current flowing in the conductive helix element 118. The winding pitch angles are selected so that the radio wave velocity matches the current velocity at any location along the length of the conductive helix element 118. As is known, the winding pitch angle is the angle α between a plane normal to the boresight axis 120 and a line tangential to a selected location on the conductive helix element 118.

FIG. 4 provides a close up view of the coupling between the ground plane structure 402 and the proximal end 408 of the conductive helix element 418. An impedance transformer may be coupled to or integrally formed with the ground plane structure 402 to transform an impedance of the conductive helix element 418 to the impedance of the coaxial cable 404. Various designs of the impedance transformer will now be described in relation to FIGS. 5-10.

Figure 5:
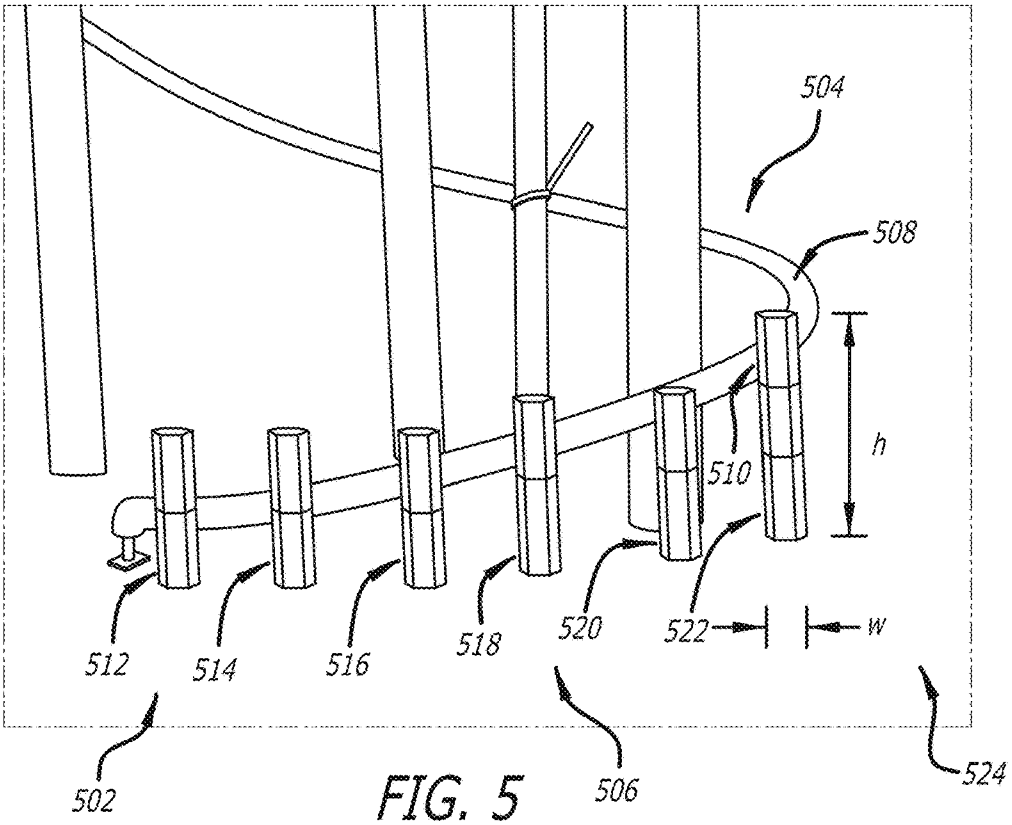
FIG. 5 provides an illustration showing an impedance transformer coupled to the ground plane of a helical antenna.

FIG. 5 shows an antenna element 500 comprising a ground plane structure 502 cooperating with a helical antenna 504 coupled thereto. The impedance transformer 506 is coupled to the ground plane structure 502 so as to be located adjacent and/or proximate to conductive helix element 508 of the helical antenna 504. The impedance transformer 506 is not in contact with the conductive helix element 508. In this way, a gap 510 is provided between the impedance transformer 506 and the conductive helix element 508. The distance between the impedance transformer 506 and the conductive helix element 508 is selected to provide a transformation of the impedance of the conductive helix element 508 to the impedance of the coaxial cable.

The impedance transformer 506 is shown in FIG. 5 as comprising a plurality of protruding structures 512, 514, 516, 518, 520, 522 coupled to the ground plane structure 502 by coupler(s). The coupler(s) can include, but are not limited to, screws, bolts, nuts, welds, adhesive and/or other coupling means. The protruding structures 512-522 are formed of the same or different conductive material. The conductive material(s) can include, but are not limited to, copper, graphite and/or steel. Any number N of protruding structure 512-522 can be provided with the impedance transformer 506, where Nis an integer equal to or greater than one. Accordingly, the present solution is not limited to six protruding structures 512-522 as shown in FIG. 5.

Each protruding structure 512-522 extends out and away from the ground plane structure 502 in a direction 524 towards the conductive helix element 508. The protruding structures 512-522 have a generally circular cross-sectional profile (not shown), a pentagon cross-sectional shape (not shown in FIG. 5), a hexagonal cross-sectional profile (shown in FIG. 5), a square cross-sectional profile (not shown), a rectangular cross-sectional profile (not shown) and/or any other shaped cross-sectional profile. The protruding structures 512-522 can have the same or different cross-sectional profiles, heights h, and/or widths w. The protruding structures 512-522 can be solid or at least partially hollow.

The protruding structures 512-522 are spaced apart from each other. The distance d between each pair of protruding structure can be the same as or different than the distance between at least one other pair of protruding structures. For example, as shown in FIG. 5, the protruding structures 512-522 are uniformly or equally spaced apart. The present solution is not limited in this regard. The protruding structures 512-522 may alternatively be non-uniformly or unequally spaced apart.

A gap 510 is provided between each of the protruding structures 512-522 and the conductive helix element 508. The size of the gap can be the same or different for each protruding structures 512-522. In the event that the gap has the same size for all protruding structures 512-522 (as shown in FIG. 5), the protruding structures 512-522 are arranged to generally follow the curvature of the conductive helix element 508.

In scenarios where the gap is different, the following arrangements are possible: two different gap sizes are alternated such that (i) a first gap size is used for the even numbered protruding structures or for M consecutive protruding structures and (ii) a second different gap size is used for the odd numbered protruding structures or for M consecutive protruding structures; or a different sized gap is used for each protruding structure. In the latter case, the size of the gap could increase or decrease from left to right or right to left. M is an integer equal to or greater than two.

Figure 6:
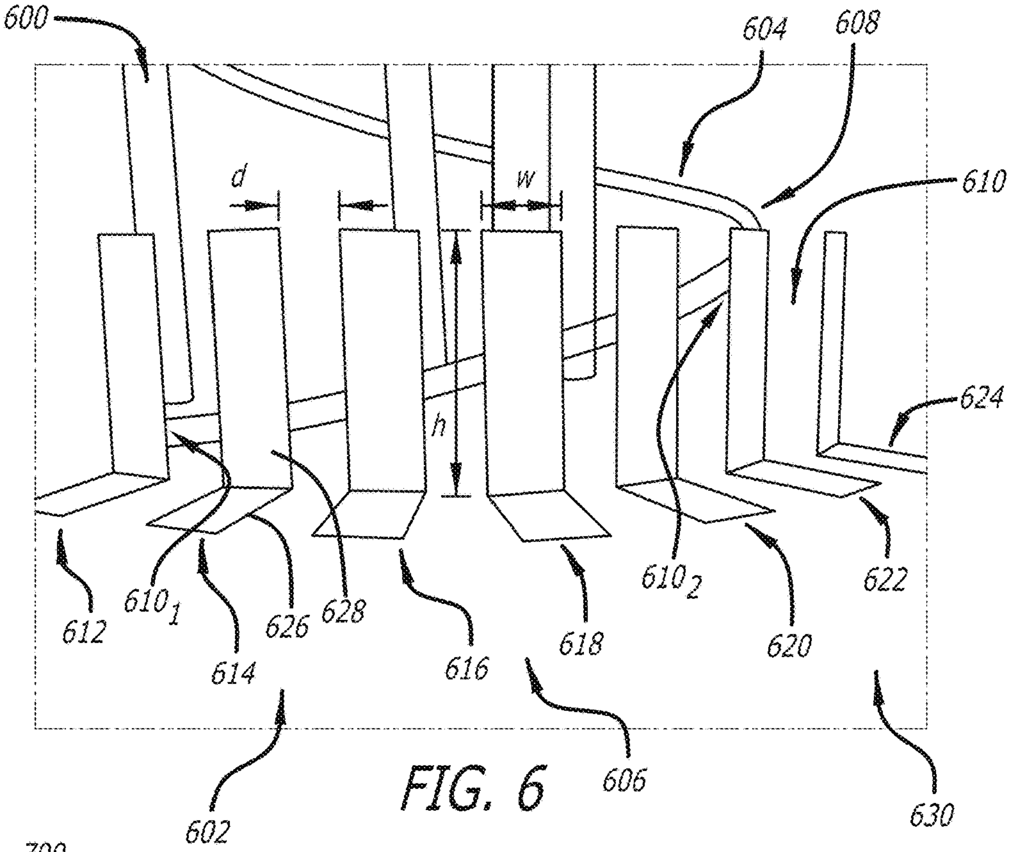
FIGS. 6-8 each provides an illustration showing another impedance transformer coupled to a ground plane.

FIG. 6 shows an antenna element 600 comprising a ground plane structure 602 cooperating with a helical antenna 604 coupled thereto. The impedance transformer 606 is coupled to the ground plane structure 602 so as to be located adjacent and/or proximate to conductive helix element 608 of the helical antenna 604. The impedance transformer 606 is not in contact with the conductive helix element 608. In this way, a gap 610 is provided between the impedance transformer 606 and the conductive helix element 608. The distance between the impedance transformer 606 and the conductive helix element 608 is selected to provide a transformation of the impedance of the conductive helix element 608 to the impedance of the coaxial cable.

The impedance transformer 606 is shown in FIG. 6 as comprising a plurality of protruding structures 612, 614, 616, 618, 620, 622, 624 coupled to the ground plane structure 602 by coupler(s). The coupler(s) can include, but are not limited to, screws, bolts, nuts, welds, adhesive and/or other coupling means. The protruding structures 612-624 are formed of conductive material, such as aluminum, copper and/or steel. Any number N of protruding structure 612-622 can be provided with the impedance transformer 506, where N is an integer equal to or greater than one. Accordingly, the present solution is not limited to seven protruding structures 612-624 as shown in FIG. 6.

Each protruding structure 612-624 has a generally L-shape in which a first portion 626 extends parallel to ground plane structure 602 and a second portion 628 extends perpendicular to the ground plane structure 602. The first and second portions 626, 628 comprise planer members that are integrally formed as a single piece or are coupled to each other via a weld, adhesive or other coupling means. The second portion 628 extends out and away from the ground plane structure 502 in a direction 630 towards the conductive helix element 608. The first portions 626 and/or second portions 628 of the protruding structures 612-624 can have the same or different heights h, widths w, and/or thicknesses t.

The protruding structures 612-624 are spaced apart from each other. The distance d between each pair of protruding structure can be the same as or different than the distance between at least one other pair of protruding structures. For example, as shown in FIG. 6, the protruding structures 612-622 are uniformly or equally spaced apart, but the spacing between protruding structure 622 and 624 is different (for example, greater) than the spacing between adjacent pairs 612/614, 614/616, 616/618, 618/620, 620/622. The present solution is not limited in this regard. The protruding structures 612-622 may alternatively be non-uniformly or unequally spaced apart. In this case, the spacings between two or more adjacent pairs 612/614, 614/616, 616/618, 618/620, 620/622, 622/624 can the same or different.

A gap 610 is provided between each of the protruding structures 612-624 and the conductive helix element 608. The size of the gap can be the same or different for each protruding structures 612-624. For example, the gap $610_1$ (between the protruding structure 612 and the conductive helix element 608) is relatively smaller than the gap $610_2$ (between the protruding structure 620 and the conductive helix element 608). The present solution is not limited to the particulars of this example.

In some scenarios (not shown), the second portion 628 of at least one protruding structure 612-624 is bent at least partially around the conductive helix element 608. The gap is provided and maintained between the bent segment of the second portion 628 and the conductive helix element 608. The size of the gap may or not vary between the second portion 628 and the conductive helix element 608.

Figure 7:
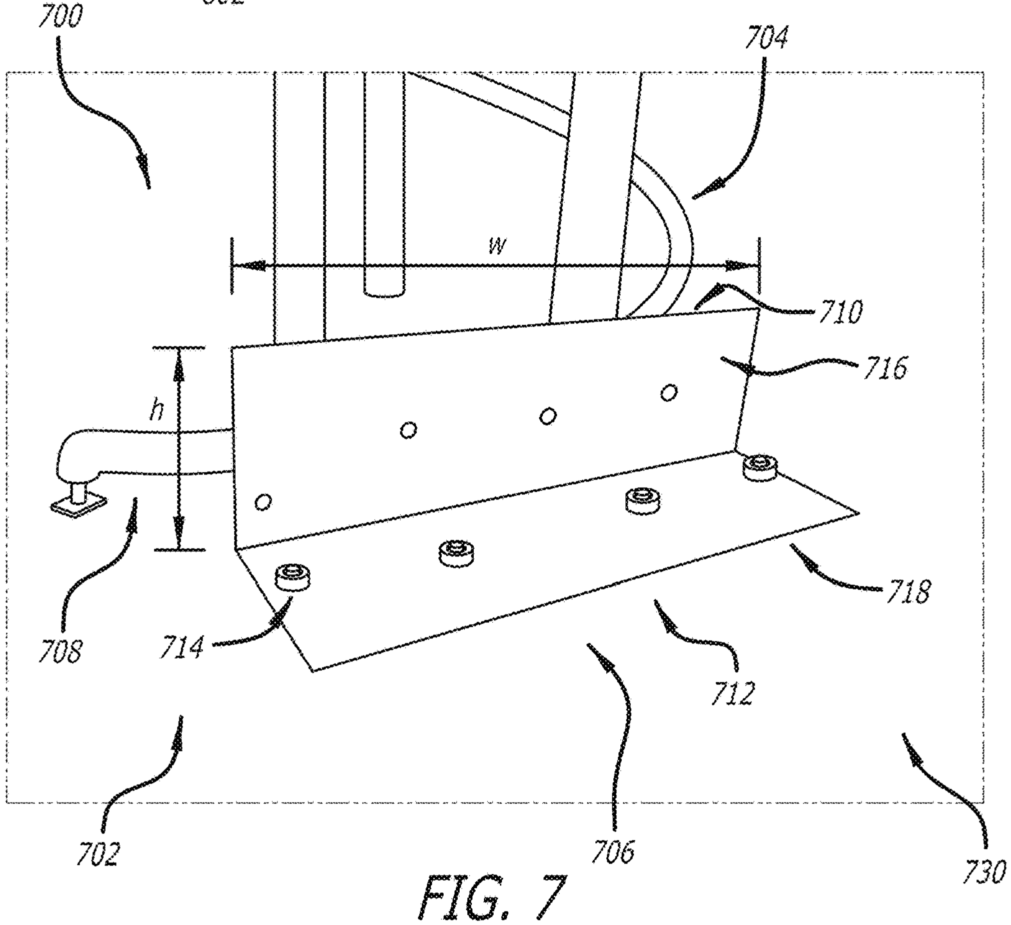

FIG. 7 provides an antenna element 700 comprising a ground plane structure 702 cooperating with a helical antenna 704 coupled thereto. The impedance transformer 706 is coupled to the ground plane structure 702 so as to be located adjacent and/or proximate to conductive helix element 708 of the helical antenna 704. The impedance transformer 706 is not in contact with the conductive helix element 708. In this way, a gap 710 is provided between the impedance transformer 706 and the conductive helix element 708. The distance between the impedance transformer 706 and the conductive helix element 608 is selected to provide a transformation of the impedance of the conductive helix element 708 to the impedance of the coaxial cable.

The impedance transformer 706 is shown in FIG. 7 as comprising a single protruding structure 712 coupled to the ground plane structure 702 by couplers 714. The couplers 714 can include, but are not limited to, screws, bolts (as shown), nuts (as shown), welds, adhesive and/or other coupling means. The protruding structure 712 is formed of conductive material, such as aluminum, copper and/or steel.

The protruding structure 712 has a generally L-shape in which a first portion 716 extends parallel to ground plane structure 702 and a second portion 718 extends perpendicular to the ground plane structure 702. The first and second portions 716, 718 comprise planer members that are integrally formed as a single piece or are coupled to each other via a weld, adhesive or other coupling means. The second portion 718 extends out and away from the ground plane structure 702 in a direction 730 towards the conductive helix element 708.

Since the second portion 718 of the protruding structure 712 is planer, the gap 710 between itself and the conductive helix element 708 varies along its width w. The present solution is not limited in this regard. The second portion 718 of the protruding structure 712 can alternatively be curved such that the size of the gap is the constant along its width or varies along its width. The curve may or may not match the curve of the conductive helix element 708.

As shown in FIG. 7, the height h of the second portion 718 of the protruding structure 712 is constant. The present solution is not limited in this regard. The height h of the second portion 718 can be varied. For example, the height h of the second portion 718 is varied to match the upward increasing height of the tubing (relative to the ground plane) forming the conductive helix element 708. The present solution is not limited to the particulars of this example.

Figure 8:
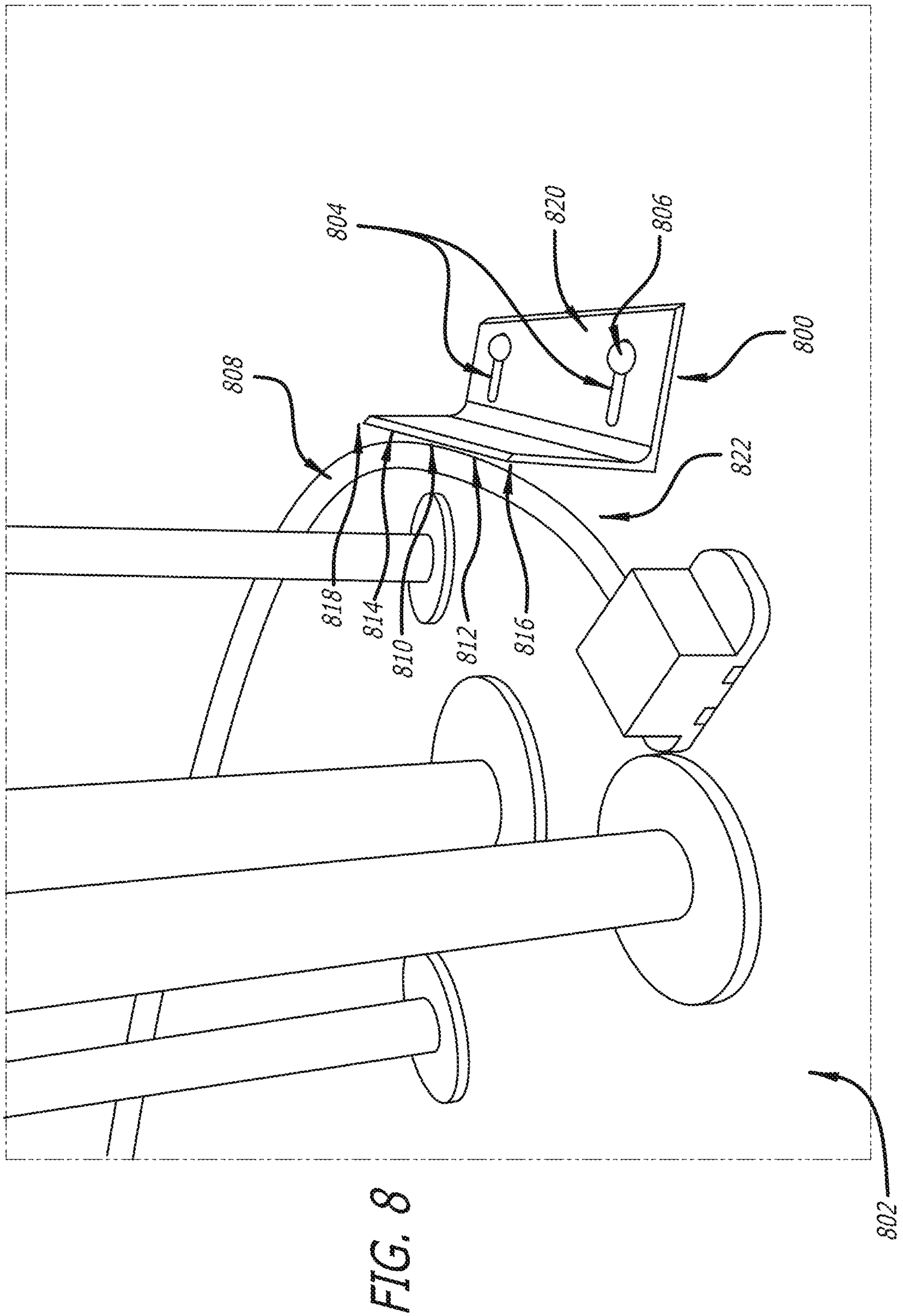

FIG. 8 shows an impedance transformer 800 coupled to a ground plane structure 802. The gap between the helical element and the impedance transformer 800 is different at different locations. For example, the gap has the smallest at the middle point 810 of the impedance transformer 800 and the largest at the end points 816, 818 of the impedance transformer 800. The gap is the same at corresponding intermediary points 812, 814 of the impedance transformer 800. The present solution is not limited to the particulars of this example.

Impedance transformer 800 is similar to impedance transformer 706 shown in FIG. 7 except for an additional feature 804 to allow for the selective adjustment of the location of the impedance transformer 800 relative to the ground plane structure 802 and the conductive helix element 808. This feature 804 comprises slot(s) or channel(s) through which a coupler(s) 806 can slide. When the coupler(s) 806 is (are) in the fully engaged position(s) shown in FIG. 8, the coupler(s) is (are) unable to move within the slot(s) or channel(s). However, the coupler(s) is (are) able to be transitioned from the fully engaged position(s) to unengaged position(s). When the coupler(s) is (are) in at least partially unengaged position(s), the coupler(s) can slide within the slot(s) or channel(s). In this way, the impedance transformer 800 can be selectively moved closer to or farther away from the conductive helix element 808. This movement of the impedance transformer 800 allows impedance matching adjustments to be made, for example, when the impedance of the antenna element changes for some reasons.

Figure 9:
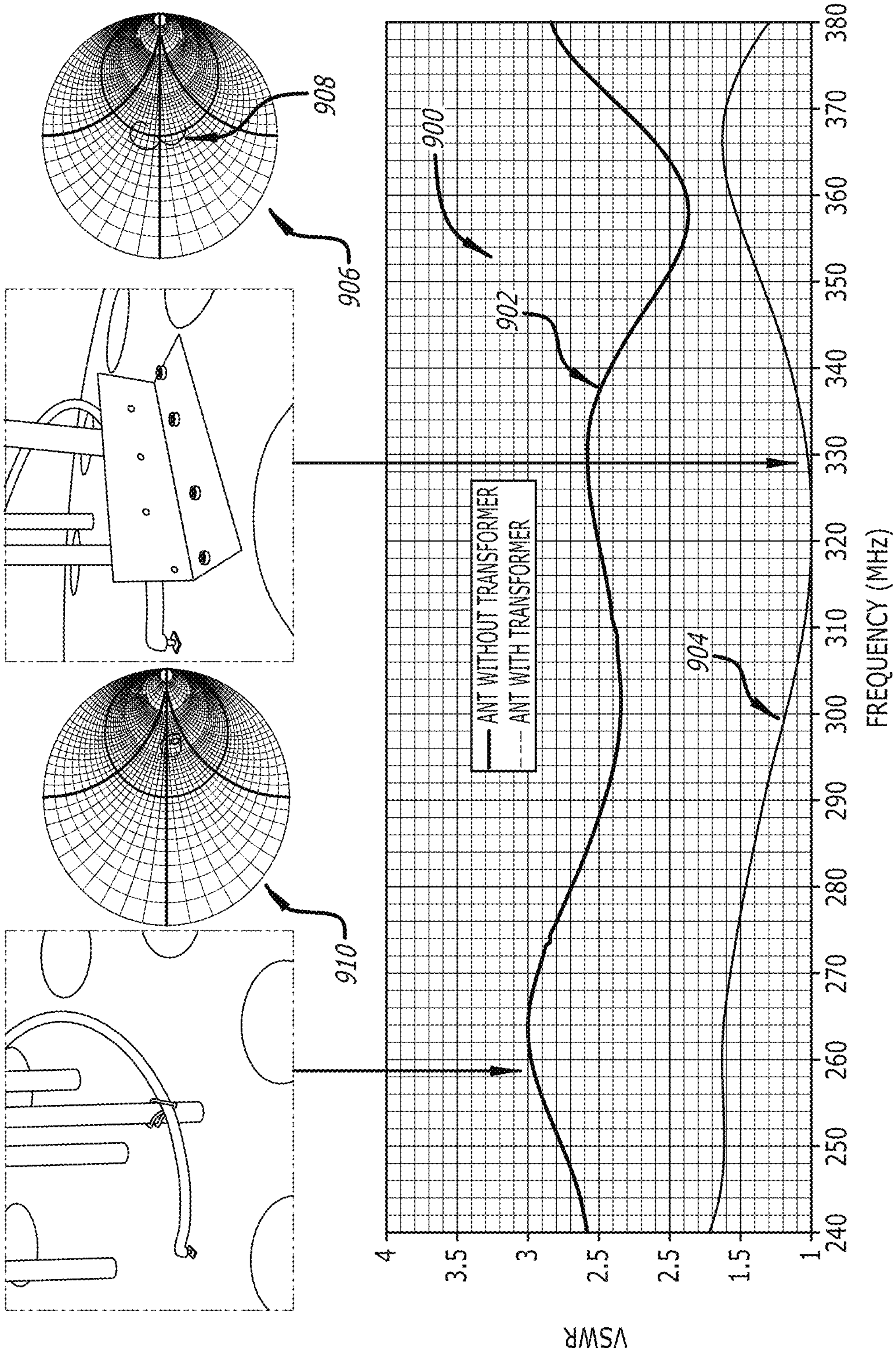
FIG. 9 provides an illustration showing an improvement in voltage standing wave ratio (VSWR) resulting from the implementation of an impedance transformer on the ground plane of a helical antenna.

FIG. 9 provides an illustration that is useful for understanding the impact of impedance transformer on the operation of a helical antenna. As can be seen in the lower graph 900 of FIG. 8, the VSWR of a helical antenna without the impedance transformer is generally above two (see line 902), while the VSWR of a helical antenna with the impedance transformer is below two (see line 904). Notably, the VSWR is one between frequencies 315 MHz to 329 MHz. A VSWR value of one indicates that the nominal antenna impedance is matched to the impedance of the coaxial cable. This is evidenced by Smith chart 906 which shows the impedance curve 908 in the center of the chart. The impedance transformer causes the impedance curve to move from the right-offset position shown in Smith chart 910 to the center position shown in Smith chart 906, which results in a significant improved performance of the helical antenna.

Figure 10:
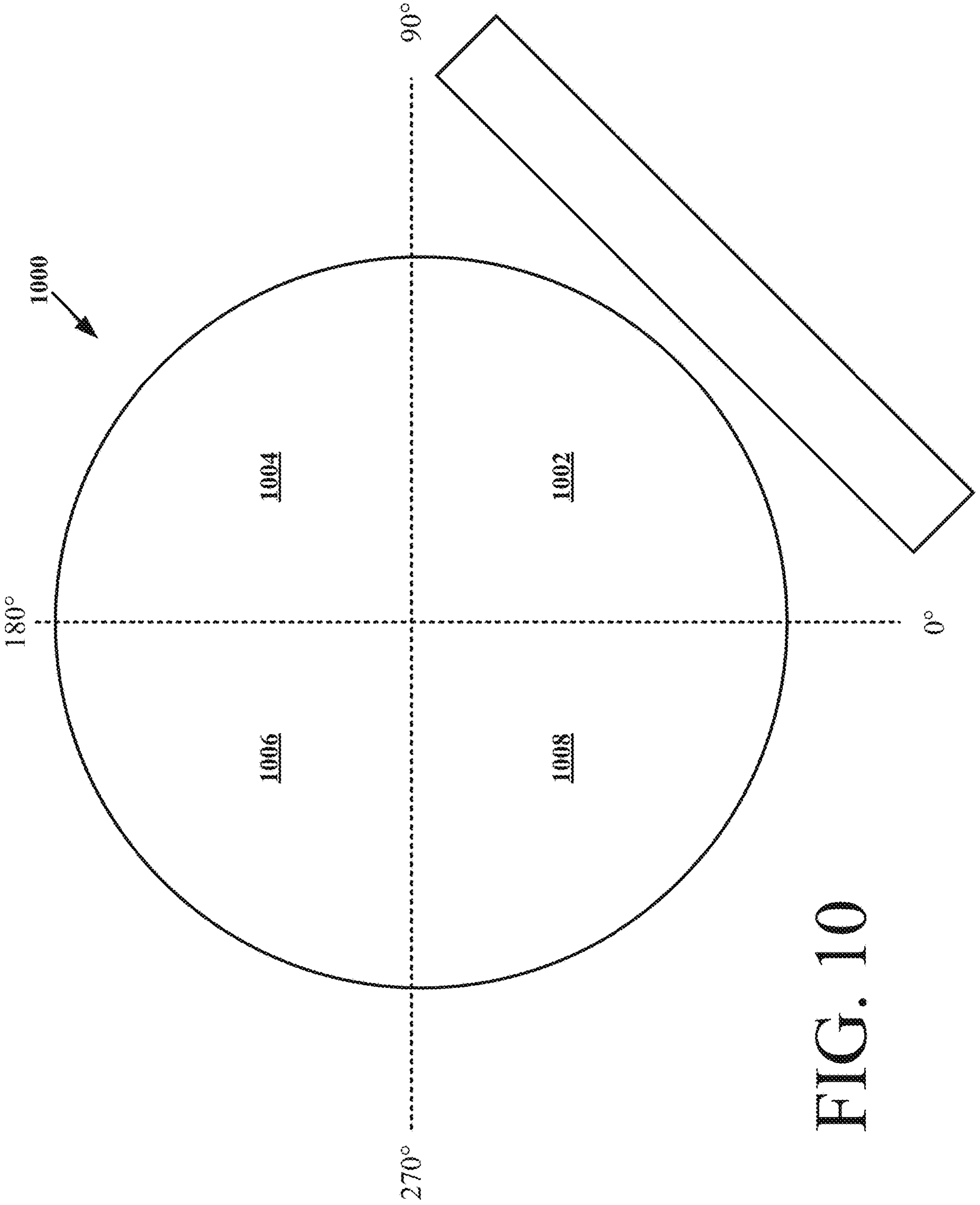
FIG. 10 provides a top view of a helical antenna with an impedance transformer located on a ground plane proximate to the helical antenna.

FIG. 10 provides a top view of a helical antenna 1000. The top view shows that the helical antenna is generally circular. Thus, the helical antenna 1000 can be considered to have a plurality of equal sized segments 1002, 1004, 1006, 1008. For example, the helical antennal can have four segments with each being associated with ¼λ or 90° of the circle. In this case, the impedance transformer is sized and shaped to reside adjacent to one of the four segments, for example, segment 1002. Also, one end of the transformer is adjacent to the antenna feed point. The present solution is not limited to the particulars of FIG. 10.

Figure 11:
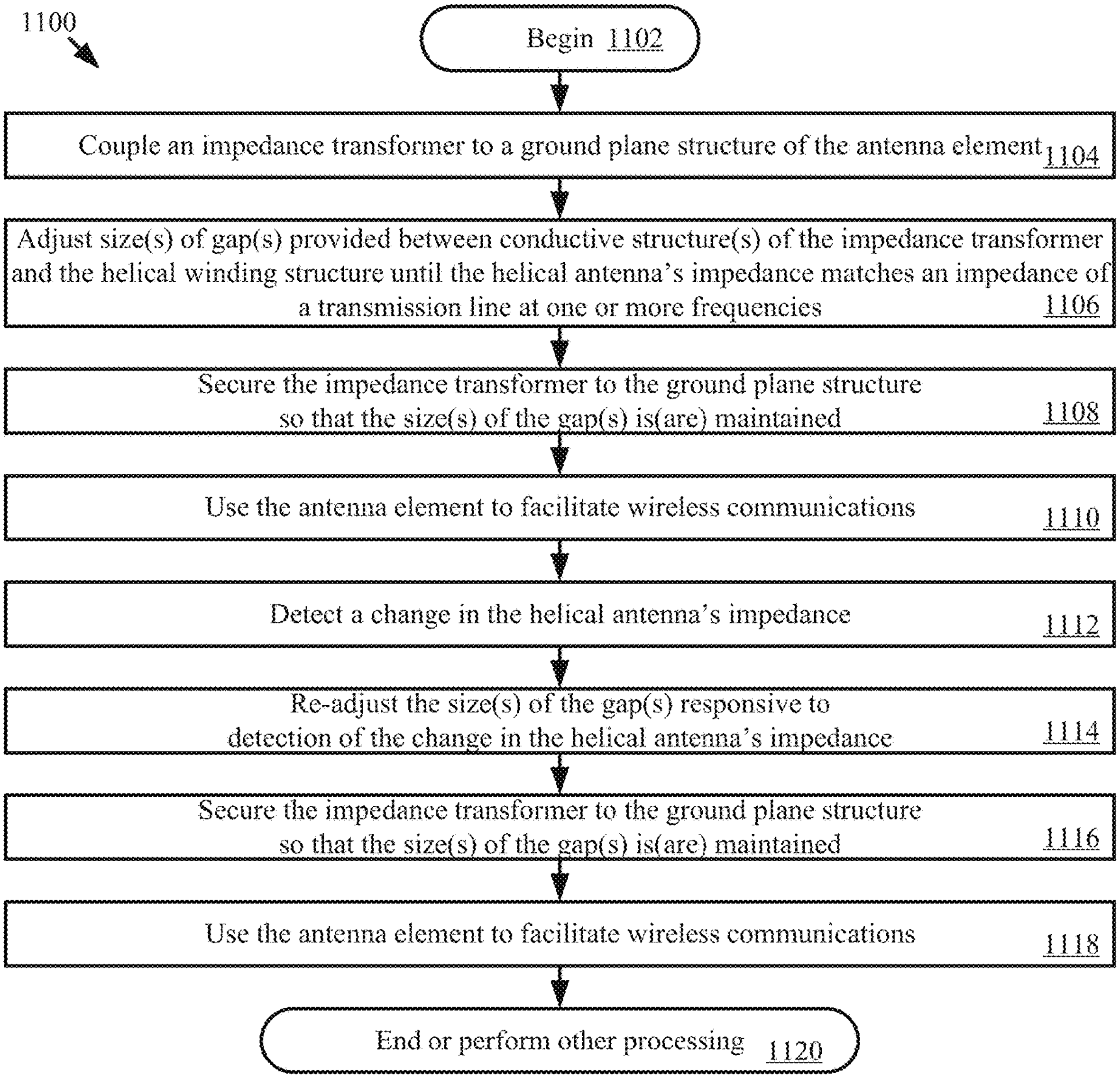
FIG. 11 provides a flow diagram of an illustrative method for operating a helical antenna.

Referring now to FIG. 11, there is provided a flow diagram of an illustrative method 1100 for operating an antenna element (for example, antenna element 114 of FIG. 1). Method 1100 begins with 1102 and continues with 1104 where an impedance transformer (for example, impedance transformer 150 of FIG. 1, 506 of FIG. 5, 606 of FIG. 6, 706 of FIG. 7, and/or 800 of FIG. 8) is coupled to a ground plane structure (for example, ground plane structure 102 of FIG. 1, 402 of FIG. 4, 502 of FIG. 5, 602 of FIG. 6, 702 of FIG. 7, or 802 of FIG. 8) of the antenna element. The impedance transformer comprises at least one conductive structure (for example, conductive structure(s) 512-522 of FIG. 5, 612-624 of FIG. 6, 712 of FIG. 7, and/or 820 of FIG. 8) protruding out and away from the ground plane structure in a direction (for example, direction 524 of FIG. 5, 630 of FIG. 6, and/or 730 of FIG. 7) towards a helical antenna (for example, helical structure 106 of FIG. 1) of the antenna element. Height(s) of the conductive structure(s) is (are) equal to or greater than a height of a segment (for example, segment 1002, 1004, 1006 or 1008 of FIG. 10) of a helical winding relative to the ground plane structure. The segment of the helical winding can include, but is not limited to, a first quarter of a first turn thereof.

In 1106, actions are performed to adjust size(s) of gap(s) (for example, gap 510 of FIG. 5, 610, $\mathbf{610}_1$, $\mathbf{610}_2$ of FIG. 6, 710 of FIG. 7, and/or 822 of FIG. 8) provided between the conductive structure(s) of the impedance transformer and the helical antenna until an impedance of the helical antenna matches an impedance of a transmission line at one or more frequencies. The term "match" as used here means to match by a certain degree, a certain percentage or a certain amount (for example, to match by ≥75%, between 75% and 100%, by ≥80%, between 80% and 100%, by ≥85%, between 85% and 100%, by ≥90%, between 90% and 100%, by ≥95%, or between 95% and 100%). The size(s) of the gap(s) is (are) constant along a width of the impedance transformer or varies (vary) along a width of the impedance transformer.

In 1108, the impedance transformer is secured to the ground plane structure so that the size of the gap is maintained. Thereafter, the antenna element is used in 1110 to facilitate wireless communication.

During building or manufacturing the antenna element, the impedance of the helical antenna may change for various reasons known to those skilled in the art. When this happens, method 1100 continues with 1112-1116. Blocks 1112-1116 involve: detecting the change in the helical antenna's impedance; re-adjusting the size(s) of the gap(s) responsive to detection of the change in the helical antenna's impedance; and securing the impedance transformer to the ground plane structure so that the size(s) of the gap(s) is (are) maintained. Next in 1118, the antenna element is used once again to facilitate wireless communications. Subsequently, 1120 is performed where method 1100 ends or other operations are performed (for example, return 1102 or 1112).

In some scenarios, the impedance transformer comprises a plurality of conductive structures that are coupled to the ground plane structure so as to (i) be spaced apart from each other and (ii) protrude out and away from the ground plane structure in the direction towards the helical antenna. The gap adjustments in blocks 1106 and/or 1114 may comprise adjusting the size of the gap between each of the plurality of conductive structures and the helical antenna. The size of the gap associated with a first one of the plurality of conductive structures is the same as or different than the size of the gap associated with a second one of the plurality of conductive structures.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for improving operations of an antenna element, comprising:

coupling an impedance transformer to a ground plane structure of the antenna element, wherein the impedance transformer comprises at least one conductive structure protruding out and away from the ground plane structure in a direction towards a helical antenna of the antenna element;

adjusting a size of a gap provided between the at least one conductive structure of the impedance transformer and the helical antenna until an impedance of the helical antenna matches an impedance of a transmission line at one or more frequencies; and securing the impedance transformer to the ground plane structure so that the size of the gap is maintained while the antenna element is being used to facilitate communications;

wherein the impedance transformer comprises a plurality of conductive structures that are coupled to the ground plane structure so as to (i) be spaced apart from each other and (ii) protrude out and away from the ground plane structure in the direction towards the helical antenna; and wherein the size of the gap associated with a first one of the plurality of conductive structures is the same as the size of the gap associated with a second one of the plurality of conductive structures.

2. The method according to claim 1, wherein the size of the gap is constant along a width of the impedance transformer.

3. The method according to claim 1, wherein the size of the gap varies along a width of the impedance transformer.

4. The method according to claim 1, wherein a height of the at least one conductive structure is equal to or greater than a height of a segment of a helical winding relative to the ground plane structure.

5. The method according to claim 4, wherein the segment of the helical winding comprises a first quarter of a first turn thereof.

6. The method according to claim 1, further comprising re-adjusting the size of the gap responsive to a change in an impedance of the helical antenna, wherein the re-adjusting is achieved by repositioning the impedance transformer relative to the ground plane structure.

7. The method according to claim 1, wherein the adjusting comprising adjusting the size of the gap between each of the plurality of conductive structures and the helical antenna.

8. An antenna element, comprising:

a helical antenna comprising a helical winding that extends along an axis of the antenna element and has a plurality of turns;

a ground plane structure coupled to the helical antenna;

an impedance transformer that is (i) integrally formed with or coupled to the ground plane structure so as to be spaced apart from the helical winding and (ii) configured to transform an impedance of the helical winding to an impedance of a transmission line; and a gap, provided between the impedance transformer and the helical winding, with a size selected to enable matching of the impedance of the helical winding to the impedance of the transmission line by a certain amount at particular frequencies;

wherein the impedance transformer comprises a plurality of conductive structures that are coupled to the ground plane structure so as to (i) be spaced apart from each other and (ii) protrude out and away from the ground plane structure in the direction towards the helical antenna; and wherein the size of the gap associated with a first one of the plurality of conductive structures is the same as the size of the gap associated with a second one of the plurality of conductive structures.

9. The antenna element according to claim 8, wherein a position of the impedance transformer relative to the ground plane structure and the helical winding is adjustable.

10. The antenna element according to claim 8, wherein the size of the gap is constant along a width of the impedance transformer or varies along a width of the impedance transformer.

11. The antenna element according to claim 8, wherein the impedance transformer comprises at least one conductive structure protruding out and away from the ground plane structure in a direction towards the helical antenna.

12. The antenna element according to claim 11, wherein a height of the at least one conductive structure is equal to or greater than a height of a first quarter of a first turn of the helical winding relative to the ground plane structure.

13. The antenna element according to claim 8, wherein the size of the gap is increased or decreased by repositioning the impedance transformer relative to the ground plane structure, responsive to a change in the impedance of the helical winding.

14. The antenna element according to claim 8, wherein the size of the gap between each of the plurality of conductive structures and the helical antenna is adjustable.

15. An antenna element, comprising:

a helical antenna comprising a helical winding that extends along an axis of the antenna element and has a plurality of turns;

a ground plane structure coupled to the helical antenna;

an impedance transformer that is (i) integrally formed with or coupled to the ground plane structure so as to be spaced apart from the helical winding and (ii) configured to transform an impedance of the helical winding to an impedance of a transmission line; and a gap provided between a sidewall surface of each of a plurality of conductive structures of the impedance transformer and the helical winding;

wherein a height of each of the plurality of conductive structures is equal to or greater than a height of a first quarter of a first turn of the helical winding relative to the ground plane structure;

wherein sizes of the gaps are selected to enable matching of the impedance of the helical winding to the impedance of the transmission line by a certain amount at particular frequencies; and wherein the size of the gap associated with a first one of the plurality of conductive structures is different than the size of the gap associated with a second one of the plurality of conductive structures.

16. The antenna element according to claim 15, wherein a particular gap size is used for the even numbered conductive structures and a different other gap size is used for the odd numbered conductive structures.

17. The antenna element according to claim 15, wherein a particular gap size is used for a first consecutive conductive structures and a different other gap size is a second consecutive conductive structures.

18. The antenna element according to claim 15, wherein the plurality of conductive structures are offset from the helical antenna in an x direction and/or y direction, where the helical antenna extends away from the ground plane in the z direction.

* * * * *